United States Patent [19]
Castagner et al.

[11] Patent Number: 5,887,894
[45] Date of Patent: Mar. 30, 1999

[54] SAFETY ARRANGEMENT FOR A MOTOR VEHICLE

[75] Inventors: Berhard Castagner, Coupvray; Jean-Pierre Boyault, Lognes; Kyriakos Vavalidis, Ferrières-en-Bray, all of France

[73] Assignee: Autoliv Development AB, Vargarda, Sweden

[21] Appl. No.: 930,555

[22] PCT Filed: Mar. 5, 1996

[86] PCT No.: PCT/SE96/00288

§ 371 Date: Feb. 4, 1998

§ 102(e) Date: Feb. 4, 1998

[87] PCT Pub. No.: WO96/31370

PCT Pub. Date: Oct. 10, 1996

[30] Foreign Application Priority Data

Apr. 3, 1995 [GB] United Kingdom .................... 9506834

[51] Int. Cl.⁶ ..................................................... B60R 21/16
[52] U.S. Cl. ...................... 280/743.2; 280/735; 280/741; 280/743.1
[58] Field of Search .............................. 280/743.1, 743.2, 280/741, 735, 736

[56] References Cited

U.S. PATENT DOCUMENTS

| 5,004,266 | 4/1991 | Miller et al. . |
| 5,181,737 | 1/1993 | Lenzen et al. . |
| 5,249,825 | 10/1993 | Gordon et al. . |
| 5,362,101 | 11/1994 | Sugiura et al. . |
| 5,460,405 | 10/1995 | Faigle et al. ............................ 280/735 |

FOREIGN PATENT DOCUMENTS

| 0586131 | 3/1994 | European Pat. Off. . |
| 4032757 | 4/1992 | Germany . |
| 4341500 | 6/1994 | Germany . |
| 2268132 | 1/1994 | United Kingdom . |
| 2282575 | 4/1995 | United Kingdom . |

Primary Examiner—Eric D. Culbreth
Attorney, Agent, or Firm—Venable; George H. Spencer; Catherine Voorhees

[57] ABSTRACT

In a safety device for a motor vehicle, an air-bag is provided having a gas inlet to receive gas from a gas generator. One or more straps pass from a point on the bag spaced from the gas inlet to a fixed point. Apparatus are provided to release the strap in response to a predetermined signal from a sensor.

19 Claims, 7 Drawing Sheets

SAFETY ARRANGEMENT FOR A MOTOR VEHICLE

BACKGROUND OF THE INVENTION

THE PRESENT INVENTION relates to a safety arrangement and more particularly, relates to a safety arrangement for use in a motor vehicle. The safety arrangement comprises an air-bag.

It has been proposed previously to provide an air-bag in a motor vehicle to provide protection for the occupant of a vehicle in the event that an accident should arise. Typically, such an air-bag is inflated by a gas generator which is activated by a sensor responsive either to an impact on part of the vehicle, or to deceleration of the vehicle in excess of a predetermined limit.

It has been proposed previously to provide two gas generators for one air-bag (DE-A-4,032,757), only one gas generator being activated if the occupant of the vehicle to be protected by the air-bag is wearing a safety belt, but both gas generators being activated if the occupant of the vehicle to be protected by the air-bag is not wearing a seat belt. It has also been proposed to provide an air-bag with two gas generators (DE-A-4,341,500), only one of the gas generators being activated when the occupant of the motor vehicle to be protected by the air-bag is leaning forwards at the moment that the air-bag is to be inflated, but both of the gas generators being activated when the occupant of the vehicle to be protected by the air-bag is in the correct position.

If only one gas generator is used to inflate an air-bag that is associated with two gas generators, when the bag is inflated it is only "partially" inflated, and consequently the position and condition of the bag will be very indefinite and uncontrolled.

SUMMARY OF THE INVENTION

The present invention seeks to provide an improved safety device.

According to this invention there is provided a safety arrangement comprising an air-bag, gas generator means to generate gas to inflate the air-bag, an opening formed in the air-bag connected to the gas generator to receive gas from the gas generator, means being provided to restrict the movement of at least part of the surface of the air-bag away from the opening, the means being releasable in response to a predetermined signal.

Preferably one or more points on the surface of the air-bag are connected by straps or the like to a fixed point, the means being provided to release the connection to the fixed point in response to the signal.

The strap or straps may be located inside the bag or may be located outside the bag.

Preferably a plurality of separate points on the surface of the bag are initially connected to the fixed point.

In one embodiment the plurality of points on the surface are connected to the first straps, which in turn are connected to the fixed point via a second strap.

Conveniently both ends of the second strap are initially connected to the fixed point, the second strap running through loops provided at the ends of the first straps.

In an alternative embodiment at least the first straps are connected to the plurality of points on the surface, one end of each first strap being connected to a respective one of a first group of the points, the other end of each first strap being connected to a respective one of a second group of the points, the first straps being initially slidingly connected to the fixed point.

Preferably the first straps are slidingly connected to the fixed point via a second strap.

Advantageously both ends of the second strap are initially connected to the fixed point, each of said first straps thus passing through the loop defined by the second strap.

In one embodiment the means to release the strap or straps comprise a bolt, which initially retains the strap or straps in position, and a pyrotechnic charge adapted to move the bolt to a strap-releasing position.

In an alternative embodiment the means to release the strap or straps comprise a movable knife adapted to be moved to cut part of the strap or straps.

Preferably the movable knife is associated with a pyrotechnic charge, the pyrotechnic charge being adapted to generate gas to move the knife to a cutting position.

In a further embodiment the means to release the strap or straps comprise means adapted to burn or melt the straps.

Conveniently the means to release the strap or straps comprise a housing, through which at least one strap passes, the housing containing a pyrotechnic charge, the arrangement being such that on ignition of the pyrotechnic charge, the strap passing through the housing is burned.

Preferably the gas generator is adapted to produce either a first volume of gas or a second greater volume of gas, the arrangement being such that the gas generator produces the second or greater volume of gas in response to the signal.

Advantageously the gas generator comprises a source of compressed gas, and means being provided to heat the gas to increase the volume of the gas in response to the signal.

Conveniently the gas generator comprises a pyrotechnic gas generator, two pyrotechnic charges being provided, one being adapted to be ignited to produce the first volume of gas and the second being adapted to be ignited to produce the second or greater volume of gas.

Advantageously means are provided to produce the signal in response to a crash of a predetermined severity, and/or in response to an occupant of the vehicle not wearing a safety belt and/or in response to the occupant of the vehicle not leaning forward.

BRIEF DESCRIPTION OF THE DRAWINGS

In order that the invention may be more readily understood, and so that further features thereof may be appreciated, the invention will now be described, by may of example, with reference to the accompanying drawings in which.

DETAILED DESCRIPTION OF THE INVENTION

In the embodiments of the invention to be described hereinafter, an air-bag is provided which is associated with one or more straps, the straps either being located on the interior of the air-bag or being located on the exterior of the air-bag and serving to confine the maximum volume to which the air-bag can be inflated, at least initially. Means are provided for releasing the straps, so that the air-bag can then be inflated to a greater volume. A sensor is provided to provide a signal to initiate inflation of the air-bag when an accident or crash is sensed. The releasing means release the straps or the like in response to a specific signal produced by a sensor. The sensor may produce the appropriate signal in response to a severe accident, or in response to the occupant not being restrained by a seat belt, or in response to a situation in which the occupant of the vehicle is not leaning forward, although preferably all three conditions are present before the signal is produced by the sensor. Alternatively, the sensor may additionally be adapted to provide the signal in a very severe crash even if the occupant of the vehicle is restrained by a seat belt.

Figure 1:
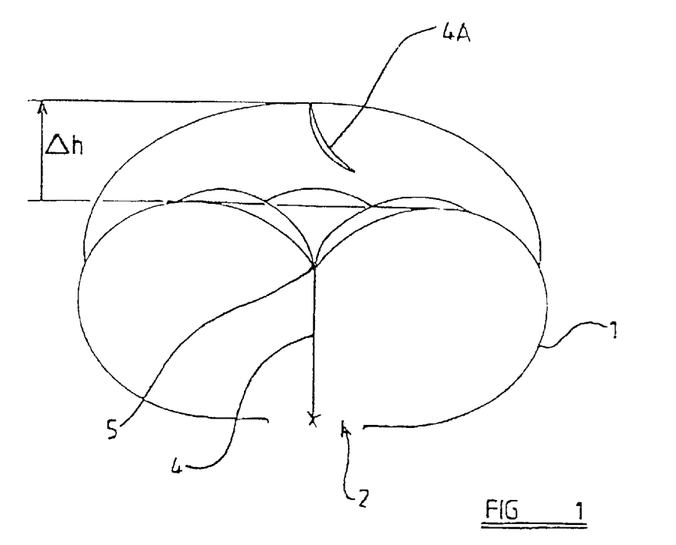
FIG. 1 is a sectional view of one form of a air-bag incorporating features of the present invention.
Figure 2:
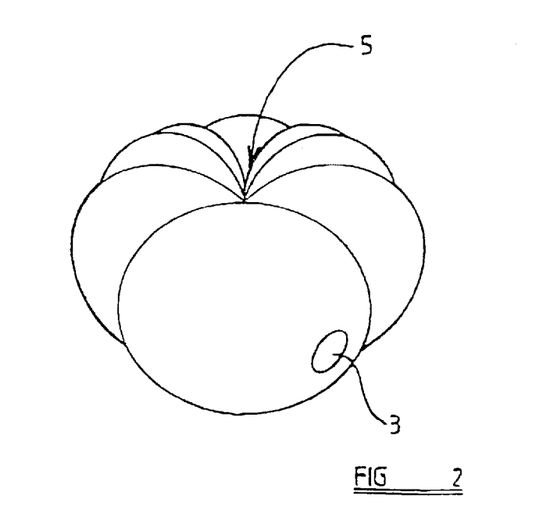
FIG. 2 is an exterior view of the air-bag of FIG. 1.

Referring initially to FIGS. 1 and 2 of the accompanying drawings, an air-bag 1 is illustrated having a gas inlet 2 which is adapted to be connected to a gas generator. The air-bag is provided with, as can be seen in FIG. 2, a gas exhaust vent 3.

The air-bag is initially supplied with a strap 4 which extends from a point adjacent the gas inlet to a point 5 on the bag which is substantially diametrically opposed to the gas inlet. Consequently the strap 4 extends across the interior of the bag.

It is to be appreciated that when the bag is initially inflated, the point 5, as shown in FIG. 2, will be retained at a fixed distance from the gas inlet 2, thus causing the air-bag to be inflated to a restricted volume.

Means are provided adapted to respond to an appropriate signal to cut or release the strap 4. The released strap 4 is shown at position 4A in FIG. 1, the bag 1 then being substantially completely inflated.

It is to be observed that the upper surface of the bag moves through a distance Δh between the partly inflated state achieved before the strap 4 is released and the fully inflated state achieved after the strap 4 is released.

Consequently the strap 4 serves to minimise the volume to which the bag can be inflated.

Figure 3:
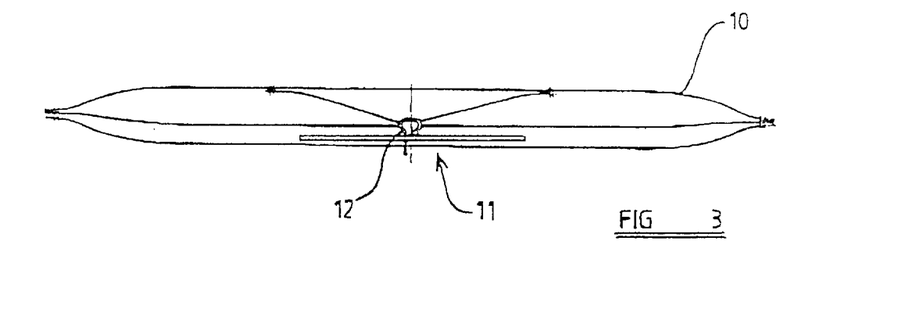
FIG. 3 is a sectional view of a second embodiment of an air-bag incorporating features of the invention.
Figure 4:
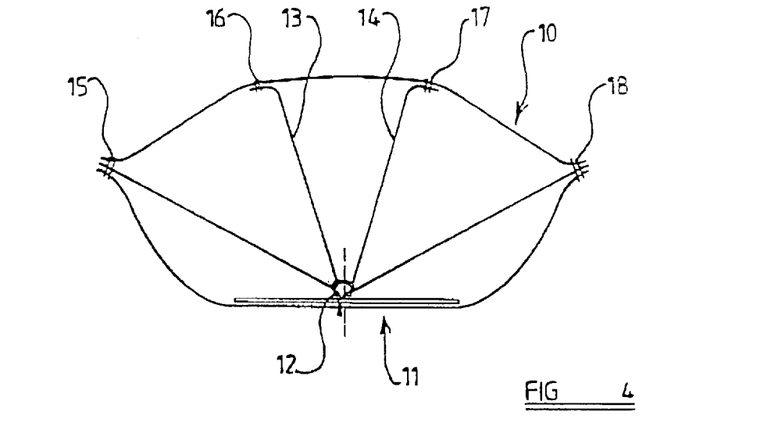
FIG. 4 illustrates the air-bag of FIG. 3 when partially inflated.
Figure 5:
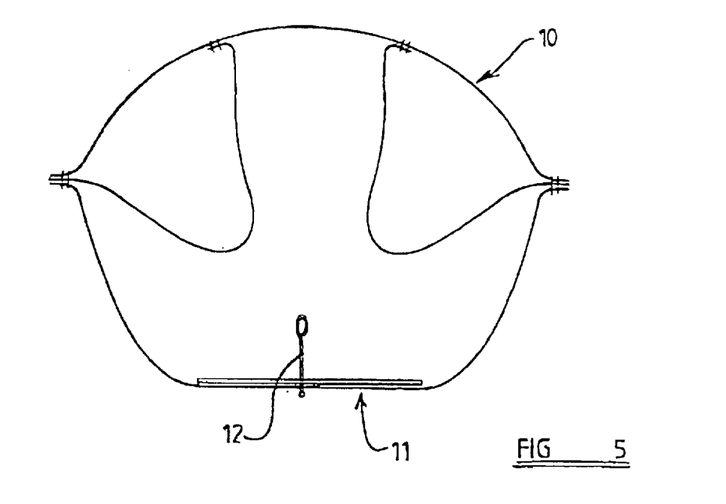
FIG. 5 illustrates the air-baa of FIG. 4 when fully inflated.

FIGS. 3 to 6 illustrate an alternative embodiment which is again provided with internal strapping to minimise the volume to which the bag can initially be inflated. Referring to FIGS. 3 to 6, an air-bag 10 is provided having a region 11 forming a gas inlet. A loop of strap 12 is provided adjacent the gas inlet, the loop of strap 12 having eight sliding straps, such as 13, 14 of FIGS. 3 to 5 passing therethrough. As seen in FIGS. 3 to 5 the sliding straps 13,14 each have both ends 15, 16, 17, 18 secured to points on the interior surface of the air-bag 10 which are located substantially diametrically opposed to the gas inlet 11. Each strap has one end secured to a respective one of a first group of points, and the other end secured to a respective one of a second group of points.

The air-bag 10 is shown in a partly inflated state in FIG. 4. It can be seen that the straps 13, 14 are substantially taut, and are retained by the loop 12. The bag 10 has been inflated to the maximum permissible volume at this stage.

Referring now to FIG. 5 it can be seen here that the loop 12 has been released, allowing the air-bag 10 to become inflated to a greater volume than as shown in FIG. 4.

Figure 6:
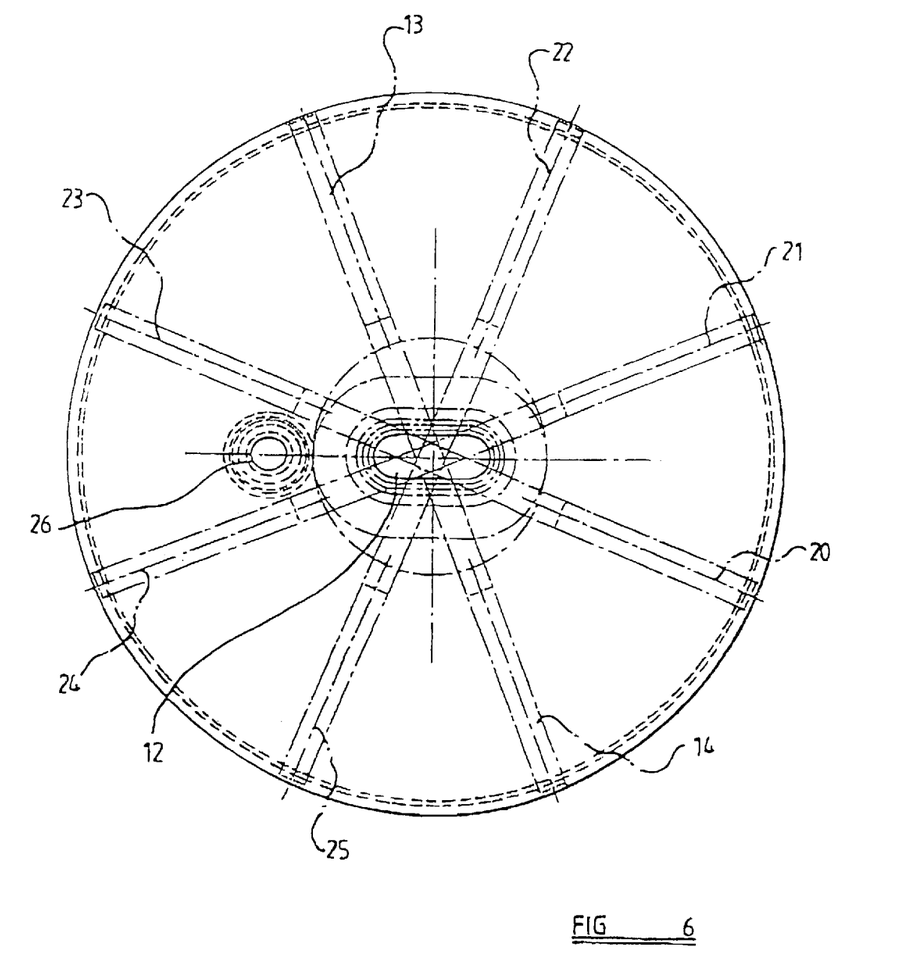
FIG. 6 is a top diagrammatic view of the air-bag of FIGS. 3 to 5.

FIG. 6 shows all eight sliding straps 13, 14, 20, 21, 22, 23, 24, 25, all of which pass through a single loop 12. The air-bag is provided with an exhaust vent 26. The use of sliding straps, as opposed to the use of fixed straps, facilitates the initial folding of the bag into a substantially flat shape as shown, for example, in FIG. 3.

Figure 7:
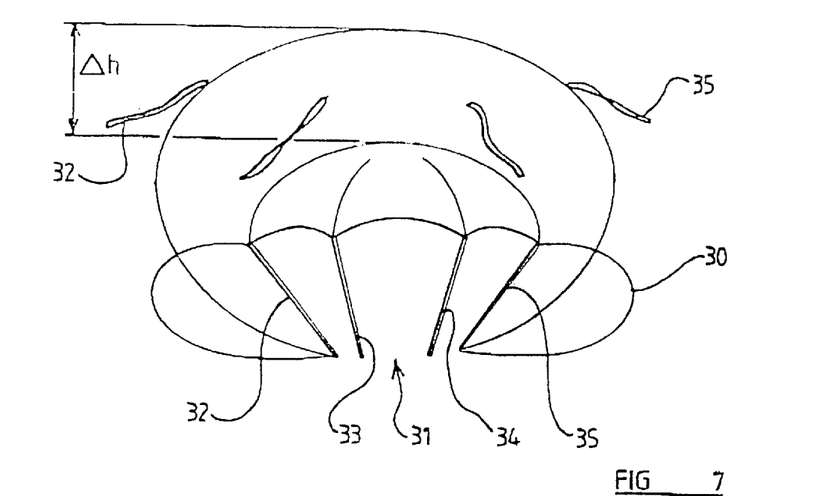
FIG. 7 illustrates another form of air-bag embodying features of the invention.
Figure 8:
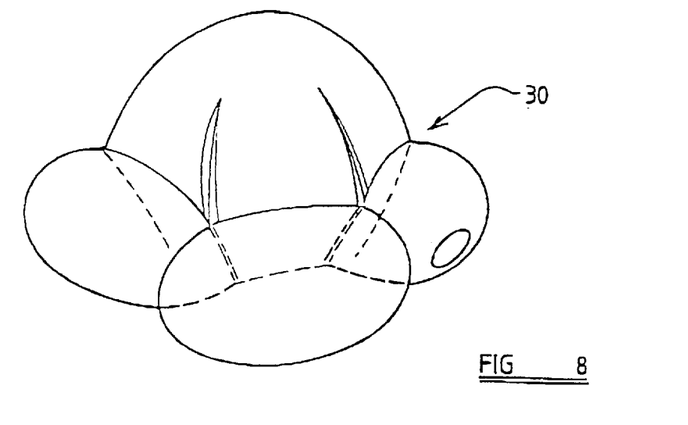
FIG. 8 is a perspective view of the air-bag of FIG. 7.

FIGS. 7 and 8 illustrate an alternative embodiment in which straps are again provided to retain the air-bag, the straps, in this embodiment, being located on the exterior of the air-bag. Thus referring to FIG. 7, an air-bag 30 is provided adapted to receive gas through a gas inlet 31. A plurality of straps 32, 33, 34, 35 are provided which initially pass over the exterior of the air-bag, limiting the volume to which the air-bag may be inflated. FIG. 8 illustrates the air-bag 30 when partly inflated when the straps are in position. Means may be provided to release the strap in response to an appropriate signal and the air-bag 30 will then inflate to the larger volume illustrated in FIG. 7.

Various mechanisms may be provided for releasing the straps.

Figure 9:
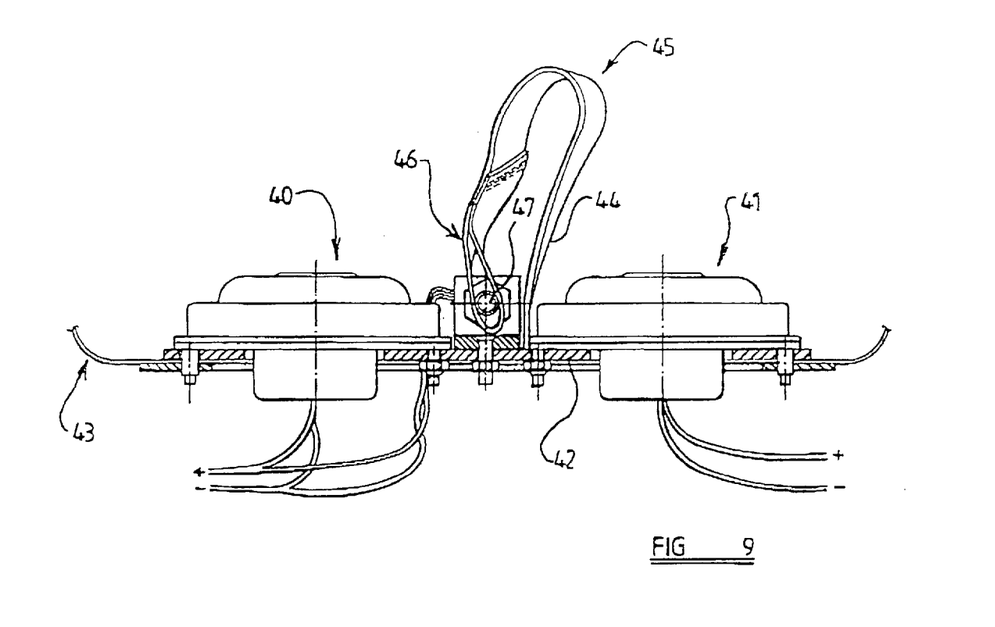
FIG. 9 is a view of part of an air-bag arrangement incorporating features of the invention.
Figure 10:
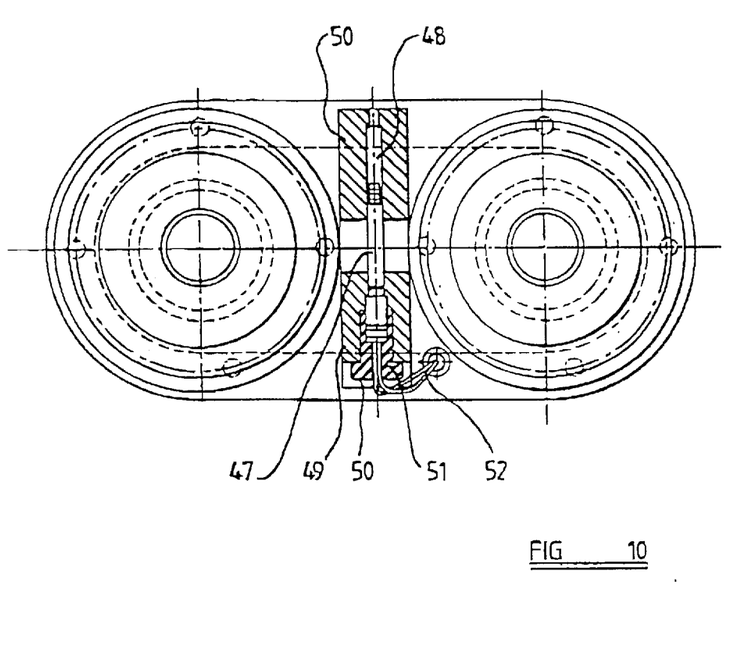
FIG. 10 is a top plan view of the arrangement shown in FIG. 9, with parts thereof cut away for the sake of clarity of illustration.

FIGS. 9 and 10 illustrate one form of mechanism that may be suitable for releasing a "loop" strap, such as is shown in FIG. 1 or in FIGS. 3 to 6.

Referring to FIG. 9, two gas generators 40, 41 are illustrated, mounted on a base plate 42. Part of an air-bag 43 surrounding a gas inlet to the air-bag is also shown connected to the plate 42.

Connected to one end of the plate 42 is a fixed end 44 of a loop strap 45. The other end of the loop strap 45 forms a folded back and stitched loop 46. The loop 46 surrounds a bolt 47, when in the initial position illustrated in FIG. 9, so that the loop strap 45 is securely anchored in position.

As can be seen from FIG. 10, the bolt 47 shown in FIG. 9 has a central part, the two opposed ends of the bolt being retained in co-aligned sections of an axial bore 48 defined by two spaced apart housing portions 49, 50. The bolt is a friction fit and thus does not move axially. However, surrounding the head of the bolt in the housing part 49, in a cavity 50 provided for the purpose, is a pyrotechnic charge 51. A squib is present within the pyrotechnic charge 51, and is connected to a sensor by electric leads 52. It is to be appreciated that when the squib is activated, the pyrotechnic charge is ignited, thus creating gas which drives the bolt 47 axially so that the bolt leaves the housing part 49 and is driven to be accommodated completely within the axial bore 48 provided in the housing part 50. It is to be appreciated that the loop 46 is then disengaged from the bolt 47, meaning that the loop strap 45 is free.

It is to be appreciated that sliding straps, such as the straps 13, 14 and 20, 21, 22, 23, 24, 25 of the embodiment shown in FIGS. 3 to 6 would pass through the loop straps 45 in such a way that when the terminal loop 46 becomes disengaged from the bolt 47, the sliding straps are released.

It is to be appreciated that a mechanism as that shown in FIG. 9 and 10 could be use to retain the lower end of the strap 4 as shown in FIG. 1, if the lower end of the strap 4 is provided with a loop such as the loop 46. Similarly, a mechanism of this type could be used to retain the ends of the straps 32–35 of the embodiment illustrated in FIGS. 7 and 8, provided that those straps each terminate, at at least one end thereof, in appropriate loops.

Figure 11:
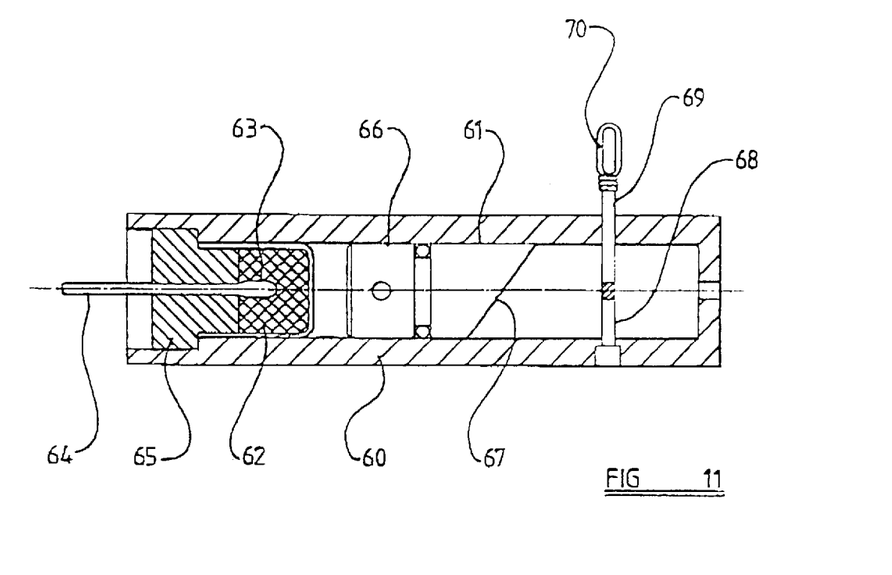
FIG. 11 is a diagrammatic view illustrating part of a further embodiment of the invention.

FIG. 11 illustrates an alternative arrangement for releasing a strap. An elongate housing 60 is provided defining a central bore 61. Received within one end of the bore is a pyrotechnic charge 62, which is associated with a squib 63 connected to wires 64 which pass through a plug 65 which seals the end of the bore and retains the pyrotechnic charge in position.

A piston 66 is provided located adjacent the charge, the piston driving a knife element 67. A length of strap 68 extends across the interior of the housing 60 at a position in front of the blade 67, the free end 69 of the strap emerging from the housing and carrying a loop 70. The loop 70 may be connected to one end of a strap 4 as shown in the embodiment of FIGS. 1 to 3 or the sliding belts 14,16, and 20–25 of the embodiment of FIGS. 3 to 6 may pass through the loop 70.

It is to be appreciated that when an appropriate signal is applied to the squib 63 through the electric lead 64, the pyrotechnic charge 62 will be ignited, generating gas which will drive the piston 66 forwardly, thus causing the knife 61 to cut the strap 68, releasing the loop 70 and thus releasing the straps connected thereto, such as the straps of the embodiments illustrated in FIGS. 1 to 7.

Figure 12:
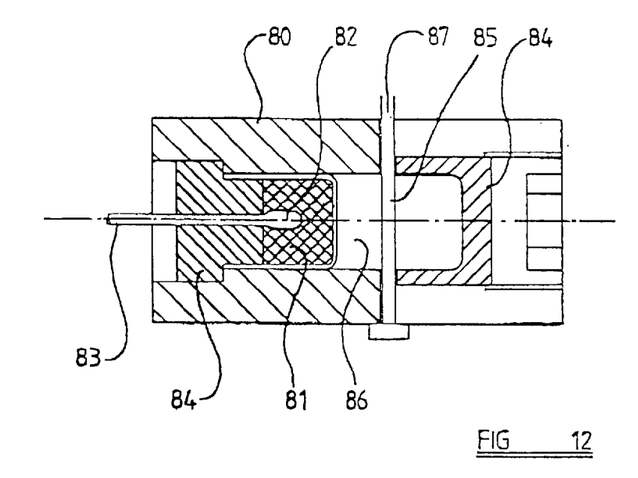
FIG. 12 is a further diagrammatic view illustrating part of yet another embodiment of the invention.

FIG. 12 illustrates another mechanism for releasing a strap. Referring to FIG. 12, an elongate substantially cylindrical housing 80 is provided containing, at one end, a pyrotechnic charge 81 which is associated with an igniting squib 82 connected to electric leads 83 which pass through a plug 84 which seals one end of the housing.

The other end of the housing is sealed by means of a sealing plug 84. A length of strap 85 passes across the cavity 86 defined within the housing.

When the squib 82 is ignited, in response to a signal supplied through the electric leads 83, the pyrotechnic charge 81 is ignited creating a flame which burns through the strap 85, or which melts the strap. The free end 87 of the strap 85, is thus released. It is to be appreciated that the free end of the strap 87 may retain a strap such as the strap 4 in the embodiment of FIGS. 1 to 2 or may retain straps such as the straps 13, 14 and 20 to 25 of the embodiment shown in FIGS. 3 to 6, or straps 32 to 35 of the embodiment shown in FIGS. 7 and 8.

It is to be appreciated that the strap release mechanism is activated by a control arrangement which responds to a sensor. The sensor may produce a signal to release the straps in response to a severe crash and/or in response to the occupant being unbelted and/or in response to the occupant of the vehicle not leaning forwardly. Preferably the straps are released only in a severe crash when the occupant of the vehicle is restrained by a seat belt and also is not leaning forwardly.

The gas generator may be adapted to produce a greater volume of gas if the signal identified above is produced. There may, as shown in FIGS. 9 and 10, be two gas generators, one gas generator ordinarily being activated, the second gas generator being activated in response to the signal. Thus, when the second gas generator is activated the straps are released.

Alternatively, a single gas generator may be provided using compressed gas. If the signal is generated, the volume of gas created by the gas generator may be increased by heating the gas. The gas may be heated by using an electrical heater or may be increased by using a relatively small pyrotechnic charge, which is ignited as gas is released from the source of compressed gas, thus heating the gas.

Alternatively, if a pyrotechnic gas generator is utilised, a first pyrotechnic charge may be activated ordinarily and a second pyrotechnic charge may additionally be activated in response to generation of the signal.

Figure 13:
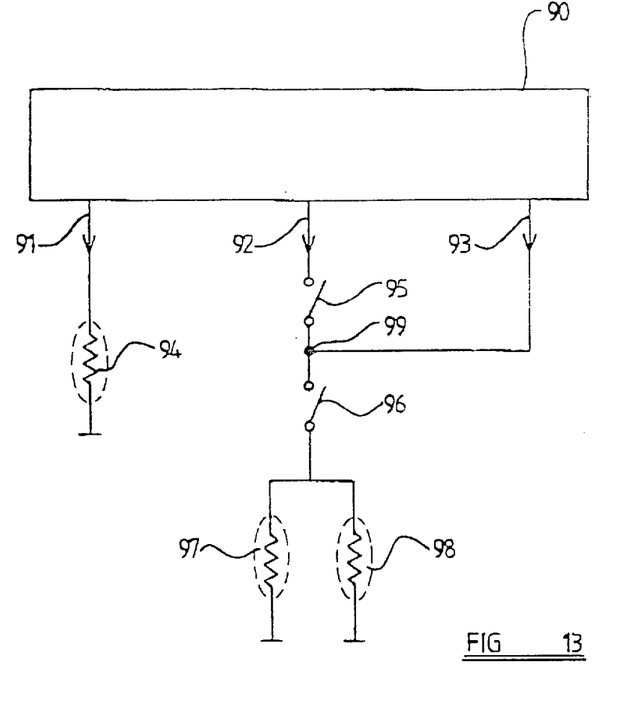
FIG. 13 is a circuit diagram of a central device for use in the invention.

Referring now to FIG. 13, a sensor arrangement for use with an embodiment of the invention is illustrated.

The sensor arrangement incorporates a sensor 90. The sensor 90 is provided with three outputs respectively 91, 92, 93.

The sensor 90 is adapted to provide an output on the output 91 whenever the sensor senses that an accident or impact has occurred. The sensor is adapted to provide an output on the output 92 when a severe accident or impact has occurred and is adapted to provide an output on the output 93 when a very severe crash or impact has occurred. Thus the crash sensor is sensitive to different degrees of impact and provides initial output signals which are dependent upon the severity of the crash or impact sensed.

The first output is illustrated as being connected to a squib 94 which is adapted to initiate inflation of the air-bag by activating a first gas generator. The squib 94 forms part of the first gas generator, which can be a pyrotechnic gas generator and is indicated schematically by the dotted line surrounding squib 94.

The second output 92 is connected to a switch 95, the switch being adapted to be open if the occupant of the vehicle is wearing a safety belt. Thus, the switch 95 nay be incorporated in the buckle mechanism of the safety belt. Alternatively, the switch 95 could be incorporated within the retractor mechanism of the safety belt and could be adapted to be opened if a predetermined length of safety belt has been withdrawn from the retractor mechanism. Of course, if a safety belt is not worn by the occupant of a vehicle, ordinarily the great proportion of the safety belt is retracted into the retractor mechanism.

The switch 95 is connected in series with a second switch 96. The switch 96 is adapted to be open if the occupant of the vehicle is leaning forward from an ordinary sitting position. The switch 96, could again be incorporated within the retractor mechanism and could be opened if more than a predetermined amount of webbing is withdrawn from the retractor mechanism. As a person, wearing a safety belt, leans forward, a greater extent of webbing is drawn out of the retractor mechanism than the extent withdrawn from the retractor mechanism when the person is in an ordinary seated position.

Alternatively, optical means may be provided for determining if the occupant of the vehicle is leaning forward, the switch 96 being controlled in accordance with the position of the person determined by the optical means. The optical means may comprise an optical distance measuring means located within the dashboard of a vehicle adapted to determine the position of the occupant of the vehicle relative to the dashboard of the vehicle, or may comprise means for directing a beam of light transversely across the motor vehicle, means being provided to determine if the beam of light is broken by a person leaning forward, thus enabling the switch 96 to be opened appropriately.

The switch 96 is connected to the parallel connection of a squib 97 adapted, for example, to activate a second gas generator, and a squib 98 adapted to activate the means for releasing the strap or straps that restrict the movement of the air-bag away from the opening associated with the gas generator. Squib 97 is associated with the second gas generator which is a pyrotechnic gas generator and is indicated schematically by the dotted line surrounding squib 97. Squib 98 is associated with the means for releasing the straps, which are indicated by an oval dotted line surrounding squib 98.

The third output 93 of the crash sensor is connected to the node 99 between the series connection of the switches 95 and 96.

It is to be appreciated that in the event that a crash or impact is sensed the squib 94 adapted to activate the first gas generator will be activated, causing initial inflation of the air-bag.

In the event that a severe crash or impact is detected, such that an output is provided by the crash sensor on the second output 92, if the occupant of the vehicle is not wearing a seat belt, and (if an optical sensor is provided) the occupant of the vehicle is not leaning forward, then the squib 97 to activate the second gas generator and the squib 98 to activate the strap releasing means are both ignited. Thus the air-bag is inflated to its full extent. It is to be noted that if the switch 96 is activated in response to the amount of webbing pulled out from the retractor mechanism, if the occupant of the vehicle is not wearing a seat belt, the switch 95 will be closed and also the switch 96 will be closed regardless of the position of the occupant of the vehicle. Thus, if the occupant of the vehicle is not wearing a safety belt, in the event of a moderate crash providing an output on the second output 92 of the crash sensor 90, the air-bag will be fully inflated In the event of a very severe crash, even if the occupant of the vehicle is wearing the safety belt, so that the switch 95 is open, nevertheless, when an output is present on the third output 93 of the crash sensor, provided that the switch 96 is closed (which will be the condition of the switch if the occupant of the vehicle is not leaning forward) then again the squibs 97 and 98 will be activated, causing full inflation of the air-bag.

It is to be appreciated that whilst, with reference to FIG. 13, reference has been made to a squib activating a first gas generator and a squib activating a second gas generator, it is to be appreciated that the squib 97 may instead activate heating means adapted to heat otherwise cold gas generated by the first gas generator.

Whilst the embodiments have been described with reference to embodiments in which the strap is initially retained by a strap or straps located inside the bag and by a strap or straps located outside the bag, it is to be appreciated that in various embodiments of the invention, the strap or straps may be connected to one or more points on the surface of the bag to connect the said one or more points to a fixed point, or alternatively, the strap or straps may each serve to connect a line along the surface of the bag to a fixed point. In a further alternative embodiment of the invention, the bag may initially be restrained by a net secured over the bag and releasably connected to a fixed point, the net being released on generation of the signal.

We claim:

1. A safety arrangement comprising an air-bag having a surface, a gas generator to generate gas to inflate the air-bag, an opening formed in the air-bag and connected to the gas generator to receive gas from the gas generator, and means for restricting the movement of at least part of the surface of the air-bag away from said opening, said means including straps which connect one or more points on the surface of the air-bag to a fixed point, said means releasing the connection to the fixed point in response to a predetermined signal.

2. An arrangement according to claim 1 wherein the strap or straps are located inside the bag.

3. An arrangement according to claim 1 wherein the strap or straps are located outside the bag.

4. An arrangement according to claim 1 wherein a plurality of separate points on the surface of the bag are initially connected to the fixed point.

5. An arrangement according to claim 4 wherein the plurality of points on said surface are connected to first straps, which in turn are connected to the fixed point via a second strap.

6. An arrangement according to claim 5 wherein both ends of the second strap are initially fixed in position, at least one end of second strap being connected to the fixed point, the second strap running through loops provided at the ends of the first straps.

7. An arrangement according to claim 4 wherein at least first straps are connected to the plurality of point on said surface, one end of each first strap being connected to a respective one of a first group of said points, the other end of each first strap being connected to a respective one of a second group of said points, the first straps being initially slidingly connected to the fixed point.

8. An arrangement according to claim 7 wherein the first straps are slidingly connected to the fixed point via a second strap.

9. An arrangement according to claim 8 wherein both ends of the second strap are initially connected to the fixed point, each of said first straps thus passing through the loop defined by the second strap.

10. An arrangement according to claim 1 wherein the means to release the straps comprise a bolt, which initially retains the straps in position, and a pyrotechnic charge adapted to move the bolt to a strap-releasing position.

11. An arrangement according to claims 1 wherein the means to release the straps comprise a movable knife adapted to be moved to cut part of the straps.

12. An arrangement according to claim 11 wherein the movable knife is associated with a pyrotechnic charge, the pyrotechnic charge being adapted to generate gas to move the knife to a cutting position.

13. An arrangement according to claim 1 wherein the means to release the straps comprise means adapted to burn at least one of the straps.

14. An arrangement according to claim 13 wherein the means to release the straps comprise a housing, through which at least one strap passes, the housing containing a pyrotechnic charge, the arrangement being such that on ignition of the pyrotechnic charge, the strap passing through the housing is burned.

15. An arrangement according to claim 1 wherein the gas generator is adapted to produce either a first volume of gas or a second greater volume of gas, the arrangement being such that the gas generator produces the second or greater volume of gas in response to the said signal.

16. An arrangement according to claim 15 wherein the gas generator comprises a source of compressed gas, means being provided to heat the gas to increase the volume of the gas in response to said signal.

17. An arrangement according to claim 15 wherein the gas generator comprises a pyrotechnic gas generator, two pyrotechnic charges being provided, one being adapted to be ignited to produce the first volume of gas and the second being adapted to be ignited to produce the second or greater volume of gas.

18. An arrangement according to claim 1 wherein means are provided to produce said signal in response to at least one of a crash of a predetermined severity, and a moderate crash where an occupant of the vehicle is not wearing a safety belt and is not leaning forward.

19. An arrangement according to claim 1 wherein the means to release the straps comprise means adapted to melt at least one of the straps.

* * * * *